United States Patent
Wen

(10) Patent No.: US 9,749,076 B2
(45) Date of Patent: Aug. 29, 2017

(54) METHOD AND APPARATUS FOR RECONFIGURING WAVELENGTH OF OPTICAL NETWORK UNIT

(71) Applicant: Alcatel Lucent, Boulogne-Billancourt (FR)

(72) Inventor: Haibo Wen, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/786,085

(22) PCT Filed: Apr. 22, 2014

(86) PCT No.: PCT/IB2014/000805
§ 371 (c)(1),
(2) Date: Oct. 21, 2015

(87) PCT Pub. No.: WO2014/181174
PCT Pub. Date: Nov. 13, 2014

(65) Prior Publication Data
US 2016/0072607 A1 Mar. 10, 2016

(30) Foreign Application Priority Data
May 6, 2013 (CN) .......................... 2013 1 0163869

(51) Int. Cl.
*H04J 14/02* (2006.01)
*H04Q 11/00* (2006.01)

(52) U.S. Cl.
CPC .......... *H04J 14/02* (2013.01); *H04J 14/0232* (2013.01); *H04J 14/0235* (2013.01);
(Continued)

(58) Field of Classification Search
USPC .......................................................... 398/79
See application file for complete search history.

(56) References Cited

U.S. PATENT DOCUMENTS

| 2013/0034356 A1* | 2/2013 | Luo ...................... H04B 10/272 398/72 |
| 2013/0094862 A1* | 4/2013 | Luo ..................... H04J 14/0278 398/68 |

FOREIGN PATENT DOCUMENTS

| CN | 101742365 A | 6/2010 |
| JP | 2006197489 A | 7/2006 |

(Continued)

OTHER PUBLICATIONS

Yuanqui Luo, Draft Document of G, International Telecommunications Union, Nov. 2011, 1-15.
(Continued)

*Primary Examiner* — David Payne
*Assistant Examiner* — Omar S Ismail
(74) *Attorney, Agent, or Firm* — Harness, Dickey & Pierce, P.L.C.

(57) ABSTRACT

The invention provides a method and apparatus for reconfiguring wavelength of the ONU. To be specific, the OLT sends a Deactivate_ONU-ID message to the ONU, the Deactivate_ONU-ID message including a reconfiguration flag, a new receive wavelength assigned for the ONU and a new transmit wavelength assigned for the ONU. After receiving the Deactivate_ONU-ID message from the OLT, the ONU discards the TC layer parameters related to the current wavelength channel, and determines whether the reconfiguration flag included in the Deactivate_ONU-ID message indicates the receive wavelength and the transmit wavelength of the ONU are required to be reconfigured. If so, then the ONU replaces its original receive wavelength and original transmit wavelength with its new receive wavelength and the new transmit wavelength included in the Deactivate_ONU-ID message, and enters initial state; and if not, then the ONU enters initial state directly.

14 Claims, 1 Drawing Sheet

(52) U.S. Cl.
CPC ...... *H04J 14/0245* (2013.01); *H04J 14/0249* (2013.01); *H04J 14/0257* (2013.01); *H04J 14/0258* (2013.01); *H04Q 11/0067* (2013.01)

(56) References Cited

FOREIGN PATENT DOCUMENTS

| JP | 2010068362 A | 3/2010 |
|---|---|---|
| JP | 2011234244 A | 11/2011 |
| WO | WO-2012136153 A1 | 10/2012 |
| WO | WO-2012136155 A1 | 10/2012 |

OTHER PUBLICATIONS

Hirotaka Nakamura, Proposed Draft of Wavelength Control and Functions for G, NTT, Feb. 2012, 1-4.
International Search Report PCT/ISA/210 for International Application No. PCT/IB2014/000805 Dated Sep. 17, 2014.
Japanese Office Action dated Dec. 13, 2016 issued in corresponding Japanese Application No. 2016-512433 (with translation).

\* cited by examiner

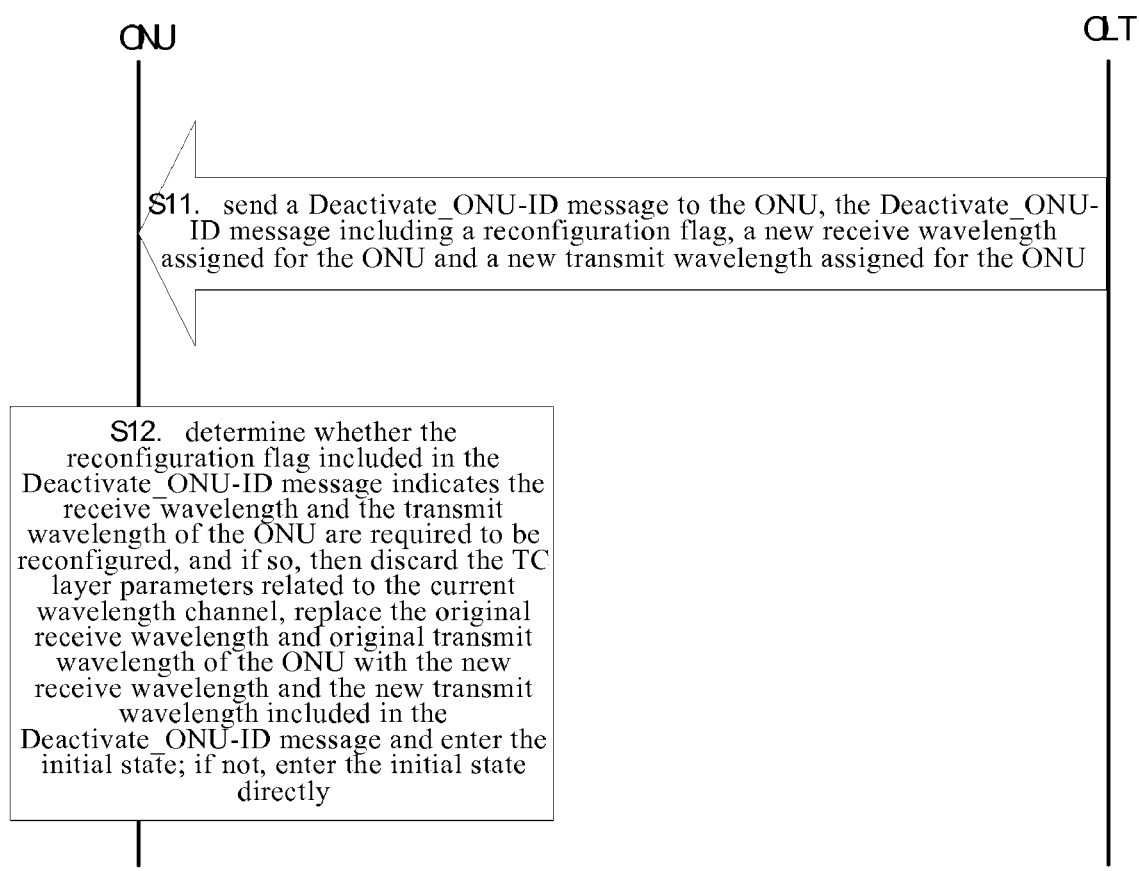

METHOD AND APPARATUS FOR RECONFIGURING WAVELENGTH OF OPTICAL NETWORK UNIT

CROSS-REFERENCE TO RELATED APPLICATIONS

This is a National Phase of PCT/IB2014/000805, filed on Apr. 22, 2014 and claims priority under 35 U.S.C. §119 to, and further claims priority to Chinese Application No. 201310163869.3, filed on May 6, 2013, the entire contents of each of which are hereby incorporated by reference.

FIELD OF THE INVENTION

The present disclosure relates to an optical communication technology and particularly to a method and apparatus for reconfiguring wavelength of an optical network unit (ONU).

BACKGROUND OF THE INVENTION

On one side, TWDM-PON (Time Wavelength Division Multiplexing-Passive Optical Network) has been considered as primary solution for NG-PON2 (Next Generation Passive Optical Network), where four XG-PONs are stacked and ONU transmitters/receivers are able to tune to any of the four upstream/downstream wavelengths. Within a wavelength, TWDM-PON reuses XG-PON downstream multiplexing and upstream access techniques, timeslot granularity, multicast capability, and bandwidth allocation mechanism.

On the other side, to open the access infrastructure network to the 3rd party is a hot topic and a trend. For example, TWDM-PON operator (i.e., A-InP) opens his TWDM-PON to the two 3rd parities, VNO (Virtual Network Operator) A and VNO B. That is to say, A-InP constructs two virtual PONs for the two VNOs. Different ONUs will be configured for different VNOs on demand.

To enter the normal Operation state, ONU must first perform the ONU activation process to obtain the parameters (such as ONU-ID, equalization delay, profile information). In XG-PON, once the network is ranged, and all ONUs are working with their correct equalization delays, all upstream bursts will be synchronized together between all the ONUs.

In XG-PON, there is no needed to change the receive/transmit wavelengths of ONU. In TWDM-PON, there is a need of reconfiguring the receive/transmit wavelength of ONU. Obviously, when the TWDM-PON is deployed in the actual access network, sometimes there are requirements to change some active ONUs' working wavelengths to the other ones because of the operator's some considerations. For instance,

- If there is only a few active ONUs, to make the power saving, we could request the active ONUs to working on the same receiving wavelength and the same transmitting wavelength.
- To make good use of broadcast of the PON, and considering the multicast/broadcast information, we can change the wavelengths of all ONUs that receiving the same multicast application to the same receiving wavelength. Thus the TWDM-PON can be more efficient.
- The end-user of VNO A is attached in the A-InP's network, and he/she wants to change to other VNO (e.g., VNO B) whose virtual access network is still on the same A-InP network. The A-InP must have the capability to change the active ONU to the other correct wavelengths used for VNO B.
- If there are too many active ONUs working on the same receive/transmit wavelength, to make the load balancing, then some ONUs must be adjusted to other wavelengths with light traffic load.

Different XG-PONs in TWDM-PON system may have their own burst profile information, different ONU-ID space, default and explicit Alloc-ID allocation scheme; thus even though the same physical ONU is attached to different XG-PON in TWDM-PON, it will have different equalization delay, ONU-ID, default Alloc-ID, and different XGEM PORT-ID, burst profiles. To make an active ONU work other wavelengths, the ONU must be stopped fast from the current wavelength, and obtain the target wavelength information and also the above-mentioned parameters for the target wavelengths via activation process.

In one existing approach, a new message $\lambda$-TUNE is defined, which carries new wavelength information to ONU. This approach has the following disadvantages. First, deactivation process is performed after the $\lambda$-TUNE message, and two subsequent interchanges are needed, that is, the $\lambda$-TUNE needs whole deactivation process and whole activation process. ONU needs to record the $\lambda$-TUNE message and use information in the $\lambda$-TUNE message in the subsequent reactivation process. Second, a quiet window is needed to avoid collisions with the regular upstream bursts during serial number acquisition and ranging of newly joining ONUs. Third, a new message type ID is needed.

SUMMARY OF THE INVENTION

To solve the problems mentioned above, the present invention proposes a solution to reconfigure receive/transmit wavelength of an active ONU in the TWDM-PON system, which could simplify ONU reactivation process.

To achieve the technical solution of the present invention, in one embodiment, the current standard Deactivate_ONU-ID PLOAM (physical layer operations/administration and maintenance) could be extended to further include a Reconfigure-Flag field, a Receive-Wavelength field, and a Transmit-Wavelength field. Where the Reconfigure-Flag field is to indicate whether the transmit/receive wavelength of the ONU are required to be reconfigured, the Receive-Wavelength field includes the new receive wavelength to be used by the receiver of the ONU, and the Transmit-Wavelength field includes the new transmit wavelength to be used by the transmitter of the ONU.

In another embodiment, a new message, which is dedicated for reconfiguration, could be defined. The new message includes the new receive wavelength and the new transmit wavelength assigned for the ONU.

Based on the ideas above, in one embodiment of the invention, there is proposed a method, in an optical network unit (ONU), of reconfiguring wavelength of the ONU, the method comprising the steps of: receiving a reconfiguration message from an optical line terminal (OLT), the reconfiguration message including new receive wavelength and new transmit wavelength assigned for the ONU; discarding TC layer parameters related to a current wavelength channel and replacing original receive wavelength and original transmit wavelength of the ONU with the new receive wavelength and the new transmit wavelength included in the reconfiguration message, such that a receiver and a transmitter of the ONU work on the new receive wavelength and the new transmit wavelength; and performing a plurality of standard procedures orderly in an activation process.

Advantageously, the reconfiguration message further includes a new ONU-ID of the ONU used in a new wavelength channel, and the step b further comprises: replacing an original ONU-ID of the ONU with the new ONU-ID included in the reconfiguration message, wherein the performance of steps related to obtaining the new ONU-ID is omitted in the step c.

Advantageously, the reconfiguration message further includes a new equalization delay of the ONU used in a new wavelength channel, and the step b further comprises: replacing an original equalization delay of the ONU with the new equalization delay included in the reconfiguration message, wherein the performance of steps related to obtaining the new equalization delay and steps of new registration of the ONU is omitted in the step c.

Advantageously, the reconfiguration message is a Deactivate_ONU-ID message and the Deactivate_ONU-ID message further includes a reconfiguration flag, wherein the step b comprises: determining whether the reconfiguration flag included in the Deactivate_ONU-ID message indicates a receive wavelength and a transmit wavelength of the ONU are required to be reconfigured; if so, then replacing original receive wavelength and original transmit wavelength of the ONU with the new receive wavelength and the new transmit wavelength included in the Deactivate_ONU-ID message, and entering initial state; if not, then entering initial state directly.

Moreover, in another embodiment, there is proposed a method, in an optical line terminal (OLT), of reconfiguring wavelength of an optical network unit (ONU), the method comprising the step of: sending a reconfiguration message to the ONU, the reconfiguration message including new receive wavelength and new transmit wavelength assigned for the ONU.

Advantageously, the method further comprises the step of: assigning a new ONU-ID and/or a new equalization delay of the ONU used in a new wavelength channel, and registering the ONU to a XG-PON system corresponding to a wavelength channel, of the ONU, to be reconfigured; wherein the reconfiguration message further includes the new ONU-ID and/or the new equalization delay of the ONU used in the new wavelength channel.

Advantageously, the reconfiguration message is a Deactivate_ONU-ID message, and the Deactivate_ONU-ID message further includes a reconfiguration flag to indicate whether a receive wavelength and a transmit wavelength of the ONU are required to be reconfigured.

The respective aspects of the invention will become more apparent from the following description of particular embodiments thereof.

BRIEF DESCRIPTION OF DRAWINGS

The foregoing and other features of the invention will become more apparent upon review of the following detailed description of non-limiting embodiments taken with reference the drawings in which:

FIG. 1 illustrates a flow chart of a method of reconfiguring wavelength of the ONU according to an embodiment of the invention.

Identical or similar reference numerals in the drawings denote identical or similar components.

DETAILED DESCRIPTION OF EMBODIMENTS

Embodiments of the invention will be described below using the extension of the current standard Deactivate_ONU-ID PLOAM message as an example.

The PLOAM channel supports XG-PON TC layer management functions. It is based upon exchange of 48-byte messages that are transported in the PLOAM partition of the downstream XGTC frame header and in the upstream XGTC burst header. The PLOAM channel supports the following functions of Burst profile communication, ONU activation, ONU registration, Encryption key update exchange, Protection switching signaling and power management.

To reconfigure the active ONU to work on another wavelengths, the ONU must be stopped from sending upstream traffic on the current working transmit wavelength, thus it must be deactivated, and then activate on the target wavelengths.

The standard Deactivate_ONU-ID message defined in G.987.3 is a downstream PLOAM message, as shown in table 1.

TABLE 1

| Message type ID | Message name | Function | Trigger | Effect of receipt |
|---|---|---|---|---|
| 0x05 | Deactivate_ONU-ID | To instruct a specific ONU to stop sending upstream traffic and reset itself. It can also be a broadcast message. | At the OLT's discretion. | The ONU with this ONU-ID switches off its laser. The ONU-ID, default and explicit Alloc-IDs, default XGEM Port-ID, burst profiles, and equalization delay are discarded. The ONU moves to the Initial state. No Acknowledgement. |

The format of the standard Deactivate_ONU-ID message is as shown in table 2.

TABLE 2

| Octet | Content | Description |
|---|---|---|
| 1-2 | ONU-ID | Directed message to one ONU or broadcast message to all ONUs. As a broadcast to all ONUs, ONU-ID = 0x03FF. |
| 3 | 0x05 | Message type ID "Deactivate_ONU-ID". |
| 4 | SeqNo | Unicast or broadcast PLOAM sequence number, as appropriate. |
| 5-40 | Padding | Set to 0x00 by the transmitter; treated as "don't care" by the receiver. |
| 41-48 | MIC | Message integrity check. |

The extended Deactivate_ONU-ID message of the technical solution of the present invention is as defined in table 3.

TABLE 3

| Message Type ID | Message Name | Function | Trigger | Effect of receipt |
|---|---|---|---|---|
| 0x05 | Deactivate_ONU-ID | To instruct a specific ONU to either stop sending upstream traffic and reset itself, or stop sending upstream traffic and reconfigure the ONU's receive/transmit wavelength and then reset itself. It can also be a broadcast message. | At the OLT's discretion. | If the reconfiguration-flag is not set, the ONU with this ONU-ID switches off its laser. The ONU-ID, default and explicit Alloc-IDs, burst profiles, and equalization delay are discarded. The ONU moves to the Initial state. If the reconfiguration-flag is set, the ONU with this ONU-ID not only performs the deactivation process defined in G.987.3, but also reconfigures the ONU's receive/transmit, and then moves to the Initial state. No Acknowledgement. |

The extended Deactivate_ONU-ID message has ONU wavelength reconfiguration sub-function, which can be used by the OLT to change/reconfigure the wavelength of the active ONU.

The format of the extended Deactivate_ONU-ID message is as shown in table 4.

TABLE 4

| Octet | Content | Description |
|---|---|---|
| 1-2 | ONU-ID | Directed message to one ONU or broadcast message to all ONUs. As a broadcast to all ONUs, ONU-ID = 0x03FF. |
| 3 | 0x05 | Message type ID "Deactivate_ONU-ID". |
| 4 | SeqNo | Unicast or broadcast PLOAM sequence number, as appropriate. |
| 5 | Reconfigure-Flag | 0- ONU directly performs the deactivation process defined in G.987.3<br>1- ONU firstly performs the deactivation process defined in G.987.3, and then enters ONU activation process to work on the wavelengths indicated in this Deactivate_ONU-ID message. |
| 6-9 | Receive-Wavelength | The wavelength to be used by the ONU's receiver |
| 10-13 | Transmit-Wavelength | The wavelength to be used by the ONU's transmitter |
| 14-40 | Padding | Set to 0x00 by the transmitter; treated as "don't care" by the receiver |
| 41-48 | MIC | Message integrity check |

As can be seen from table 4 and table 2, the extended Deactivate_ONU-ID message further includes a Reconfigure-Flag field, a Receive-Wavelength field, and a Transmit-Wavelength field.

If the Reconfigure-Flag field is 0, the Receive-Wavelength field and the Transmit-Wavelength field must set to 0. Now this means the message is a standard Deactivate_ONU-ID PLOAM message defined in G.987.3

If the Reconfigure-Flag field is 1, the Receive-Wavelength field and the Transmit-Wavelength field contain the wavelength information which will be used by this deactivated ONU.

It is to be noted that, in practical application, alternatively, "1" could represent that ONU directly performs the deactivation process defined in G.987.3, and "0" could represent that ONU firstly performs the deactivation process defined in G.987.3 and then enters ONU activation process to work on the wavelengths indicated in this Deactivate_ONU-ID message.

Hereafter, the method of reconfiguring wavelength of the ONU according to one embodiment of the invention will be described in details, based on the above extended Deactivate_ONU-ID message.

First, in step S11, the OLT sends a Deactivate_ONU-ID message to the ONU, the Deactivate_ONU-ID message including a reconfiguration flag (reconfigure flag), a new receive wavelength assigned for the ONU and a new transmit wavelength assigned for the ONU.

After receiving the Deactivate_ONU-ID message from the OLT, in step S12, the ONU determines whether the reconfiguration flag included in the Deactivate_ONU-ID message indicates the receive wavelength and the transmit wavelength of the ONU are required to be reconfigured.

If the reconfiguration flag does not indicate that the receive wavelength and the transmit wavelength of the ONU are required to be reconfigured, then the ONU enters the initial state directly, that is, switches off its transmitter, discard TC layer configuration parameters, etc. Then, ONU goes into activation process to listen to downstream transmission, obtain PSync and subframe synchronization, etc, which are existing steps in prior art and will not be repeated herein.

If the reconfiguration flag indicates that the receive wavelength and the transmit wavelength of the ONU are required to be reconfigured, then the ONU discards TC layer parameters related to the current wavelength channel, replace the original receive wavelength and original transmit wavelength of the ONU with the new receive wavelength and the new transmit wavelength included in the Deactivate_ONU-ID message, and goes to the initial state. Then, the ONU performs a plurality of standard procedures orderly in the activation process. Since the original receive wavelength and original transmit wavelength of the ONU are replaced with the new receive wavelength and the new transmit wavelength, the ONU will work the new working wavelengths later.

Advantageously, the Deactivate_ONU-ID message can be further extended to include other essential parameters of the ONU, for example, the new ONU-ID of the ONU used in the new wavelength channel, the new equalization delay of the ONU used in the new wavelength channel, etc.

In this embodiment, the OLT needs to assign the new ONU-ID and/or the new equalization delay of the ONU used in the new wavelength channel, and register the ONU to a XG-PON system corresponding to a wavelength channel, of the ONU, to be reconfigured. After receiving the Deactivate_ONU-ID message from the OLT, besides the ONU replaces the original receive wavelength and original transmit wavelength with the new receive wavelength and new transmit wavelength, it could also replace the original ONU-ID with the new ONU-ID and the original equalization delay with the new equalization delay.

Since the ONU obtains its new ONU-ID and new equalization delay used in the new wavelength channel through the Deactivate_ONU-ID message, the steps related to obtaining these parameters and related to registration could be omitted in the subsequent ONU activation process. That is, after synchronization and obtaining profile information, the ONU will skip to operational state directly. As a result, the subsequent ONU activation process is simplified.

Those skilled in the art shall appreciate that the invention apparently will not be limited to the foregoing exemplary embodiments and can be embodied in other specific forms without departing from the spirit or essence of the invention. Accordingly the embodiments shall be construed anyway to be exemplary and non-limiting. Any reference numerals in the claims shall not be construed as limiting the scope of the invention. Moreover apparently the term "comprising" will not preclude another element(s) or step(s), and the term "a" or "an" preceding an element will not preclude a plurality of this element. A plurality of elements stated in an apparatus claim can alternatively be embodied as a single element in software or hardware. The terms "first", "second", etc., are intended to designate a name but not to suggest any specific order.

The invention claimed is:

1. A method, in an active optical network unit (ONU), of reconfiguring wavelength of the active ONU, the method comprising the steps of: receiving a reconfiguration message from an optical line terminal (OLT), the reconfiguration message including new receive wavelength and new transmit wavelength assigned for the active ONU; performing, based on the reconfiguration message, both of, discarding transmission convergence layer parameters related to a current wavelength channel and replacing original receive wavelength and original transmit wavelength of the active ONU with the new receive wavelength and the new transmit wavelength included in the reconfiguration message, and subsequently de-activating and re-activating the active ONU, such that a receiver and a transmitter of the re-activated ONU work on the new receive wavelength and the new transmit wavelength.

2. The method according to claim 1, wherein,
the reconfiguration message further includes a new ONU-ID of the active ONU used in a new wavelength channel, and
the discarding includes replacing an original ONU-ID of the active ONU with the new ONU-ID included in the reconfiguration message, and
the de-activating and re-activating omits performance of steps related to obtaining the new ONU-ID.

3. The method according to claim 1, wherein,
the reconfiguration message further includes a new equalization delay of the active ONU used in a new wavelength channel,
the discarding includes replacing an original equalization delay of the active ONU with the new equalization delay included in the reconfiguration message, and
the de-activating and re-activating omits performance of steps related to obtaining the new equalization delay and steps of registration of the active ONU to a XG-PON system corresponding to a wavelength channel, of the active ONU, to be reconfigured.

4. The method according to claim 1, wherein,
the reconfiguration message is a Deactivate_ONU-ID message and the Deactivate_ONU-ID message further includes a reconfiguration flag, and
the discarding includes
determining whether the reconfiguration flag included in the Deactivate_ONU-ID message indicates that a receive wavelength and a transmit wavelength of the active ONU are required to be reconfigured, and
based on the determining, performing one of,
replacing original receive wavelength and original transmit wavelength of the active ONU with the new receive wavelength and the new transmit wavelength included in the Deactivate_ONU-ID message, and subsequently switching off the transmitter of the active ONU, based on determining that the reconfiguration flag indicates that the receive wavelength and the transmit wavelength of the active ONU are required to be reconfigured, or
directly switching off the transmitter of the active ONU, based on determining that the reconfiguration flag does not indicate that the receive wavelength and the transmit wavelength of the active ONU are required to be reconfigured.

5. A method, in an optical line terminal (OLT), of reconfiguring wavelength of an active optical network unit (ONU), the method comprising: sending a reconfiguration message to the active ONU, the reconfiguration message including a new receive wavelength and a new transmit wavelength assigned for the active ONU, such that the reconfiguration message, upon being received by the active ONU, causes the active ONU to perform both of, discarding transmission convergence layer parameters related to a current wavelength channel and replace original receive wavelength and original transmit wavelength of the active ONU with the new receive wavelength and the new transmit wavelength included in the reconfiguration message in a subsequent, de-activation and subsequently de-activating and re-activating the active ONU, such that a receiver and a transmitter of the re-activated ONU are configured to work on the new receive wavelength and the new transmit wavelength.

6. The method according to claim 5, further comprising:
assigning a new ONU-ID and/or a new equalization delay of the active ONU used in a new wavelength channel, and registering the active ONU to a XG-PON system corresponding to a wavelength channel, of the active ONU, to be reconfigured;
wherein the reconfiguration message further includes the new ONU-ID and/or the new equalization delay of the active ONU used in the new wavelength channel.

7. The method according to claim 5, wherein the reconfiguration message is a Deactivate_ONU-ID message, and the Deactivate_ONU-ID message further includes a reconfiguration flag to indicate whether a receive wavelength and a transmit wavelength of the active ONU are required to be reconfigured.

8. An apparatus, in an active optical network unit (ONU), for reconfiguring wavelength of the active ONU, the apparatus comprising: communication interface configured to receive a reconfiguration message from an optical line terminal (OLT), the reconfiguration message including new receive wavelength and new transmit wavelength assigned for the active ONU; a memory storing a program of instructions; and processor configured to execute the program of instructions to, based on the reconfiguration message, perform both of, discarding transmission convergence layer parameters related to a current wavelength channel and to replace original receive wavelength and original transmit wavelength of the active ONU with the new receive wavelength and the new transmit wavelength included in the reconfiguration message, and subsequently de-activating and re-activating the active ONU, such that a receiver and a transmitter of the re-activated ONU work on the new receive wavelength and the new transmit wavelength.

9. The apparatus according to claim 8, wherein,
the reconfiguration message further includes a new ONU-ID of the active ONU used in a new wavelength channel,
the processor is configured to execute the program of instructions to replace an original ONU-ID of the active ONU with the new ONU-ID included in the reconfiguration message, and
the de-activating and re-activating includes omitting performance of steps related to obtaining the new ONU ID.

10. The apparatus according to claim 8, wherein,
the reconfiguration message further includes a new equalization delay of the active ONU used in a new wavelength channel,
the processor is configured to execute the program of instructions to replace an original equalization delay of the active ONU with the new equalization delay included in the reconfiguration message, and
the de-activating and re-activating includes omitting performance of steps related to obtaining the new equalization delay and steps of registration of the active ONU to a XG-PON system corresponding to a wavelength channel, of the active ONU, to be reconfigured.

11. The apparatus according to claim 8, wherein,
the reconfiguration message is a Deactivate_ONU-ID message and the Deactivate_ONU-ID message further includes a reconfiguration flag, and
the discarding includes
determining whether the reconfiguration flag included in the Deactivate_ONU-ID message indicates a receive wavelength and a transmit wavelength of the active ONU are required to be reconfigured, and based on determining, performing one of,
replacing original receive wavelength and original transmit wavelength of the active ONU with the new receive wavelength and the new transmit wavelength included in the Deactivate_ONU-ID message, and subsequently switching off the transmitter of the active ONU, based on determining that the reconfiguration flag indicates that the receive wavelength and the transmit wavelength of the active ONU are required to be reconfigured, or
switching off the transmitter of the active ONU directly, based on determining that the reconfiguration flag does not indicate that the receive wavelength and the transmit wavelength of the active ONU are required to be reconfigured.

12. A system, comprising: active optical network unit (ONU); and an optical line terminal (OLT) configured to reconfigure wavelength of the active ONU, the OLT configured to send a reconfiguration message to the active ONU, the reconfiguration message including new receive wavelength and new transmit wavelength assigned for the active ONU the active ONU configured to, based on the reconfiguration message, perform both of, discarding transmission convergence layer parameters related to a current wavelength channel and replace original receive wavelength and original transmit wavelength of the active ONU with the new receive wavelength and the new transmit wavelength included in the reconfiguration message in a subsequent de-activation, and subsequently de-activating and re-activating the active ONU, such that a receiver and a transmitter of the re-activated ONU work on the new receive wavelength and the new transmit wavelength.

13. The system according to claim 12, the OLT further including,
a memory storing a program of instructions; and
a processor configured to execute the program of instructions to assign a new ONU-ID and/or a new equalization delay of the active ONU used in a new wavelength channel, and to register the active ONU to a XG-PON system corresponding to a wavelength channel, of the active ONU, to be reconfigured;
wherein the reconfiguration message further includes the new ONU-ID and/or the new equalization delay of the active ONU used in the new wavelength channel.

14. The system according to claim 12, wherein the reconfiguration message is a Deactivate_ONU-ID message, and the Deactivate_ONU-ID message further includes a reconfiguration flag to indicate whether a receive wavelength and a transmit wavelength of the active ONU are required to be reconfigured.

* * * * *